United States Patent [19]
Palmer et al.

[11] Patent Number: 5,392,655
[45] Date of Patent: Feb. 28, 1995

[54] OPTICAL PICKUP AND SIGNAL ANALYZING SYSTEM FOR MASS FLOWMETERS

[75] Inventors: Duane E. Palmer, Stanwood; Bruce E. Johnson; David L. Brodeur, both of Seattle; William E. Chiles, Kirkland, all of Wash.

[73] Assignee: ELDEC Corporation, Lynnwood, Wash.

[21] Appl. No.: 35,445

[22] Filed: Mar. 23, 1993

[51] Int. Cl.[6] .............................................. G01F 1/82
[52] U.S. Cl. .............................. 73/861.35; 73/861.77
[58] Field of Search ..................... 73/861.35, 861.77

[56] References Cited

U.S. PATENT DOCUMENTS

| | | | |
|---|---|---|---|
| 3,877,304 | 4/1975 | Vetsch | 73/231 |
| 3,958,447 | 5/1976 | Baker et al. | 73/32 |
| 4,012,957 | 3/1977 | Chiles et al. | 73/231 |
| 4,206,642 | 6/1980 | Bearcroft | 73/194 |
| 4,282,883 | 8/1981 | Yerushalmy | 73/861.77 |
| 4,438,648 | 3/1984 | Cheney, Jr. | 73/195 |
| 4,681,395 | 7/1987 | Lindsay et al. | 350/96.16 |
| 4,851,666 | 7/1989 | Anderson et al. | 73/861.77 |
| 4,858,474 | 8/1989 | Glasheen et al. | 73/861.35 |
| 4,936,151 | 6/1990 | Tokio | 73/861.77 |

OTHER PUBLICATIONS

Johnson B. et al., "Macrobend fiber optic transducer for aerospace applications," Conference Proceedings of the SPIE 1988 Fiber Optic Systems for Mobile Platforms II Conf., 989:68–77 (1988).
Johnson, B. et al., "A Standard fiber optic sensor interface for aerospace applications: Time Domain Intensity Normalization (TDIN),:" Conference Proceedings of the SPIE 1988 Fiber Optic Systems for Mobile Platforms II Conf., 989:57–67 (1988).
Pitt, G. D. et al., "Optical–fibre sensors," IEE Proceedings, vol. 132, Pt. J., No. 4, pp. 214–248, (Aug. 1985).
Pitt, G. D. et al., "Optical Fibre Flowmeters," Proceedings 2nd International Conference on Optical Fiber Sensors, Stuttgart, Germany, pp. 35–38 (Sep. 1984).
Wade, C. A., "The Application of Fiber Optic technology to Flowmeters," Naval Research Laboratory Memorandum Report 6568 (Oct. 26, 1989).

*Primary Examiner*—Richard E. Chilcot, Jr.
*Assistant Examiner*—Harshad Patel
*Attorney, Agent, or Firm*—Christensen, O'Connor, Johnson & Kindness

[57] ABSTRACT

The impeller and drum of a motorless in-line mass flowmeter are constructed with small optical targets having high reflectivity. Light is pulsed toward the path of rotation of the targets through optical fibers. The pulse width is small in comparison to the delay between pulses. Reflections of the pulses from the optical targets are conveyed by a single output fiber to a remote location where the optical pulses are converted to electrical pulses. The electrical pulses can be analyzed to determine the speed of the impeller and the deflection angle of the impeller relative to the drum, for accurate determination of the mass flow rate of liquid passing through the flowmeter.

9 Claims, 6 Drawing Sheets

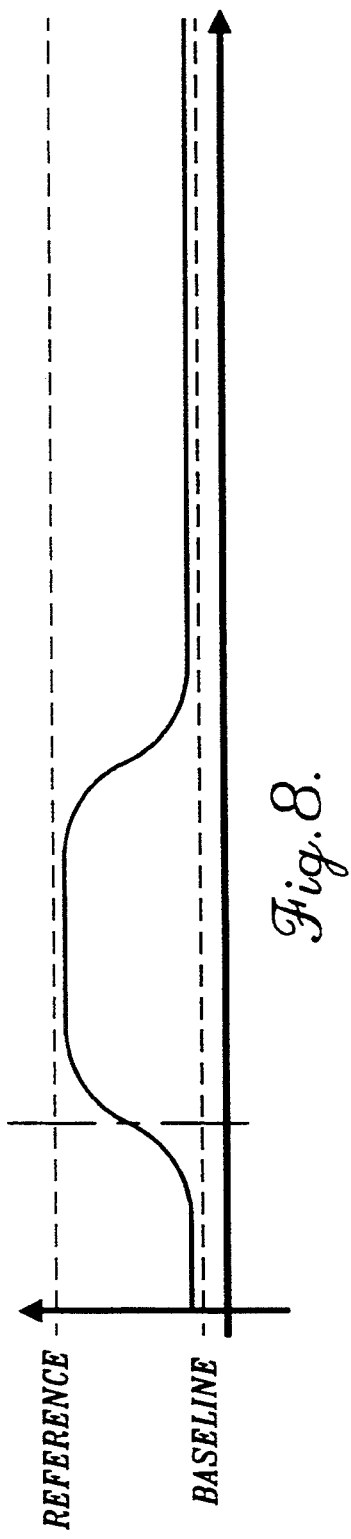
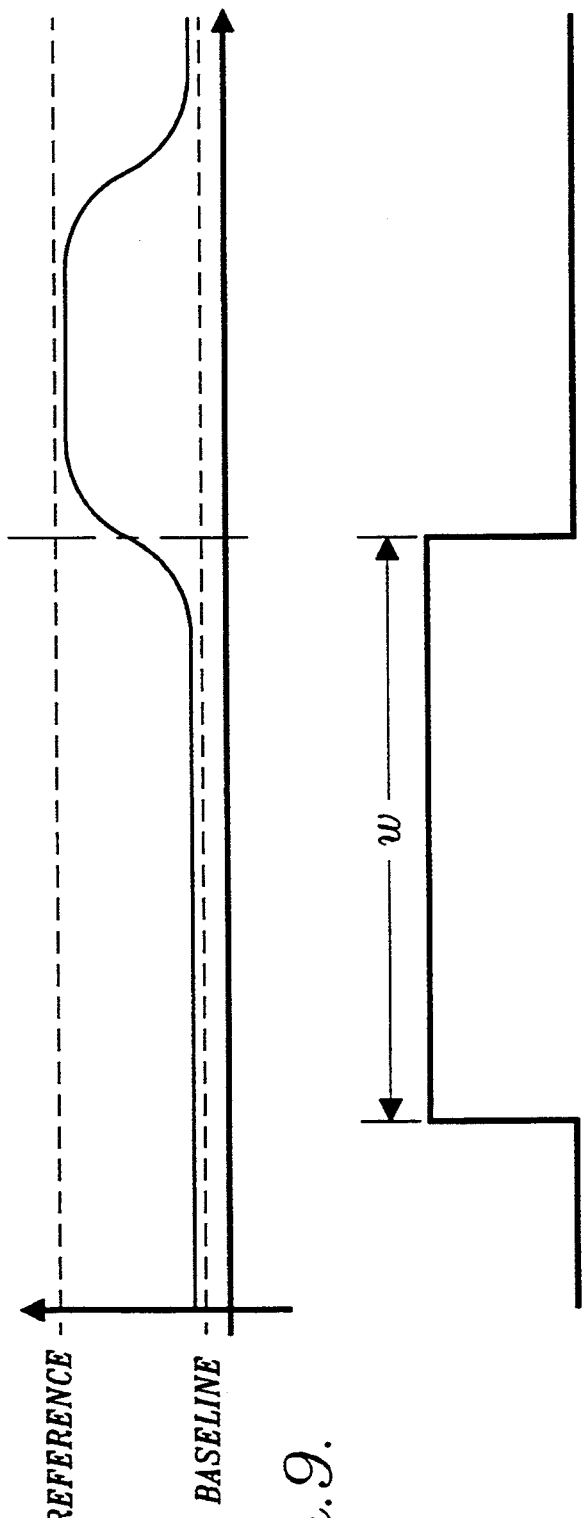
Fig. 8.
Fig. 9.
Fig. 10.

OPTICAL PICKUP AND SIGNAL ANALYZING SYSTEM FOR MASS FLOWMETERS

FIELD OF THE INVENTION

The present invention relates to apparatus for measuring the flow rate of a fluid passing through a conduit. More specifically, the present invention relates to such apparatus using a rotating member in the fluid stream and mechanism for measuring drag forces exerted on the rotating member by the fluid.

BACKGROUND OF THE INVENTION

In modern aircraft engines, it is essential to monitor precisely the mass flow rate of fuel supplied to the engines. One general type of motorless in-line flowmeter for aircraft is shown in the following U.S. patents:

| Patentee | U.S. Pat. No. | Issue Date |
| --- | --- | --- |
| Vetsch | 3,877,304 | April 15, 1975 |
| Baker et al. | 3,958,447 | May 25, 1976 |
| Chiles et al. | 4,012,957 | March 22, 1977 |
| Cheney, Jr. | 4,438,648 | March 27, 1984 |

In a motorless in-line mass flowmeter of the general type shown in the above patents, fuel first passes by and imparts rotary motion to a turbine mounted on a longitudinally extending shaft. The fuel then passes through a stationary component having passages for "straightening" the fuel so as to remove any circumferential moment and direct the fuel axially toward the next component of the flowmeter. The rotating shaft passes through the straightener and then through an impeller having radial vanes in the path of the fuel. The impeller is mechanically interconnected with the shaft by a torsion spring such that torque is imparted to the impeller by rotation of the shaft. Depending on the mass of fuel passing through the flowmeter, the impeller will lag behind the shaft due to the drag of the fuel passing between the radial vanes of the impeller. Usually the impeller is received in a drum fixed to the shaft and the torsion spring is connected between the drum and the impeller.

In the known flowmeter, the drum, the impeller and adjacent mechanical components, including the casing of the flowmeter, are formed of nonmagnetic material such as an appropriate aluminum alloy; but both the impeller and the drum carry small magnets. Electromagnetic pickup coils are used to detect rotation of the magnets. Usually the pickup coils are mounted externally of the flowmeter, although in some constructions the pickup coils are internal. The coils can be aligned radially with the circular paths travelled by the magnets, or the coils can be aligned axially with the magnets. Low level inductive pulses are generated which are analyzed to determine the speed and deflection angle of the impeller. The mass flow rate of fuel passing through the flowmeter can be calculated from the deflection angle and speed. Care must be taken to assure that electromagnetic interference does not impede performance and accuracy.

SUMMARY OF THE INVENTION

The present invention provides a motorless in-line mass flowmeter having mechanical components similar to the components described above but without magnetic pickups and circuitry affected by electromagnetic interference. Rather, the impeller and drum are constructed with small optical targets having a reflectivity much higher than the remainder of the drum and impeller in the area of the targets. Light is pulsed toward the path of rotation of the targets through optical fibers. The pulse width is small in comparison to the delay between pulses. Reflections of the pulses from the optical targets are conveyed by a single output fiber to a remote location where the optical pulses are converted to electrical pulses. The electrical pulses can be analyzed to determine the speed of the impeller and the deflection angle of the impeller relative to the drum.

In the preferred embodiment, uniform input pulses are conveyed to a splitter which branches to three optical fibers. One fiber has a coated end to act as a mirror for providing reference reflections of the input pulses. The second fiber leads to the drum and has a coiled portion to achieve a delay of known duration between a returning reference pulse and a pulse reflected from the optical target of the drum. The third fiber leads to the impeller and has a longer delay coil for pulses reflected from the optical target of the impeller. The reflected pulses are coupled to the single return or output line. The origins of the returning pulses can be determined by circuitry which samples the returning pulses at the appropriate times corresponding to the known delays. The intensity level of the returning reference pulses is used for automatic gain control. Comparison of the delay between the onset of a pulse reflected from the drum as compared to the onset of a pulse reflected from the impeller provides the information on the deflection angle of the impeller for calculating the mass flow rate.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 8, FIG. 9 and FIG. 10 are graphs of waveforms generated by the system in accordance with the present invention based on optical pulses of the type illustrated in FIGS. 6 and 7.

DETAILED DESCRIPTION OF THE PREFERRED EMBODIMENT

Figure 1:
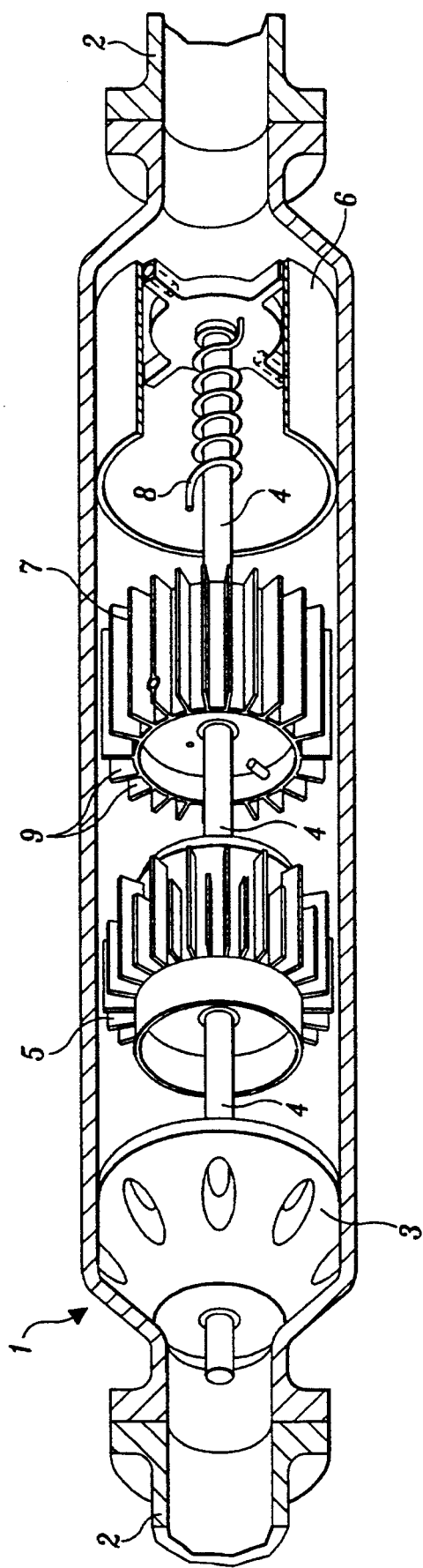
FIG. 1 is a diagrammatic perspective of components of a conventional motorless in-line mass flowmeter with parts shown in exploded relationship.

FIG. 1 diagrammatically illustrates mechanical components of a motorless in-line flowmeter 1 for measuring the mass of fuel passing through a fuel line 2 to an aircraft engine. Flowmeter 1 has a turbine component 3 fixed on a long axially extending shaft 4. Fuel passing through the fuel line 2 drives the turbine to rotate the shaft. The fuel then passes through a stationary straightener 5 and leaves the straightener in an axial direction with essentially no circumferential moment.

Downstream of the straightener but still fixed on the shaft 4 is a drum 6 with an internal cavity receiving an impeller 7. The impeller is rotatable relative to the shaft but is interconnected with drum 6 by a torsion spring 8. The impeller tends to rotate with the drum due to the action of the torsion spring 8; but rotation of the impeller is impeded by the drag of fuel passing between its radial vanes 9. The velocity of the impeller and the deflection angle of the impeller relative to the drum is a function of the mass of fuel passing through the flowmeter.

Figure 2:
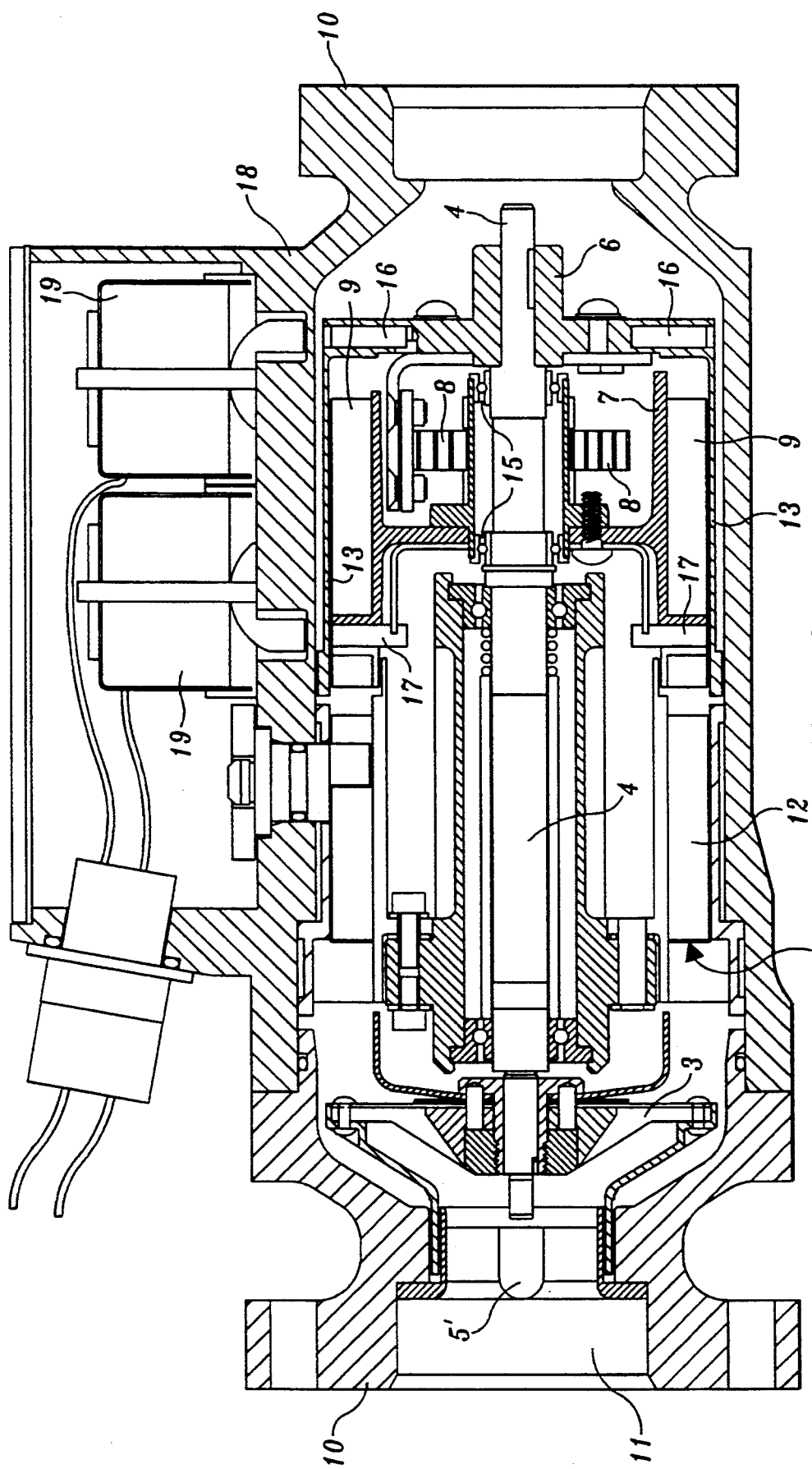
FIG. 2 is a longitudinal section through a conventional motorless in-line mass flowmeter having components of the type shown in FIG. 1.

A known motorless in-line mass flowmeter of the general type illustrated in FIG. 1 is shown in more detail in FIG. 2. The flowmeter of FIG. 2 corresponds to the model 9-217-33 flowmeter available from Eldec Corporation of Lynnwood, Wash., used on some model 747 aircraft manufactured by Boeing Commercial Airplane Company. Such flowmeter has end fittings or flanges 10 for coupling to the aircraft fuel line (not shown). Fuel enters through a central bore 11 and a prestraightener 5' for passage through the turbine 3. The central shaft 4 rotates with the turbine. Straightener 5 is fixed to the flowmeter casing and has long axially extending channels 12 to direct fuel flow in an axial direction. Drum 6 is fixed on the shaft 4 at the outlet end of the flowmeter. Impeller 7 is fitted inside the cavity of drum 6. For example, the thin cylindrical wall 13 of the drum 6 closely encircles the radial vanes 9 of the impeller 7. Beatings 15 permit rotation of the impeller relative to the central shaft; but the impeller is interconnected with the drum by the torsion spring 8.

In the conventional flowmeter shown in FIG. 2, two small cylindrical magnets 16 are imbedded in the drum 6, 180° apart, close to the outlet end and adjacent to the inner periphery of the flowmeter casing. Separate magnets 17 are carried 180° apart by the impeller 7 at a location upstream from magnets 16, close to the inner periphery of the drum wall 13. The flowmeter casing 18 is formed of nonmagnetic material, as are the drum, impeller and adjacent mechanical components. Magnetic pickups 19 are mounted on the casing to detect passage of the magnets 16 and 17. The electronic circuitry of the known flowmeter produces and analyzes low level inductive pulses to determine the velocity and deflection angle of the impeller.

Figure 3:
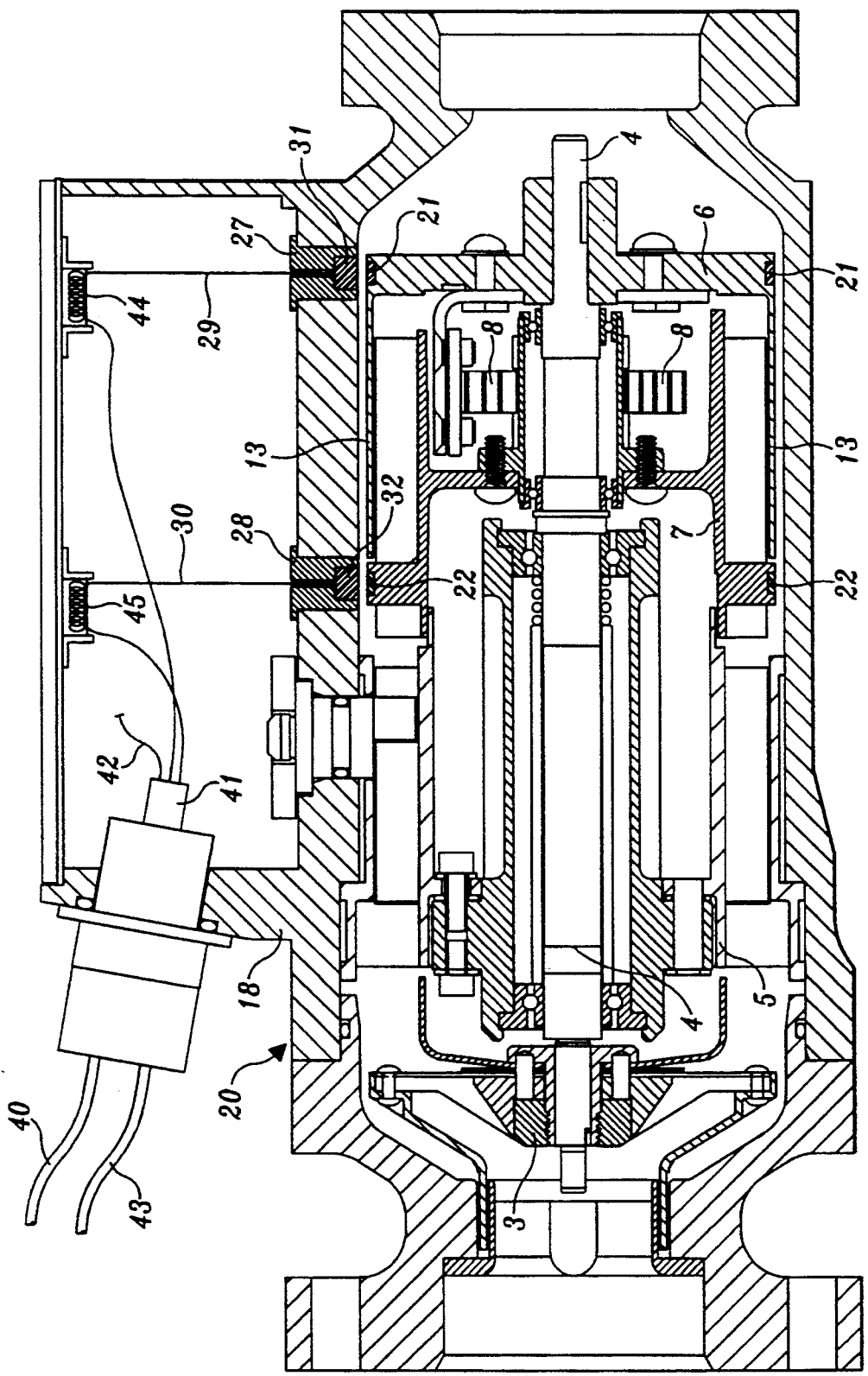
FIG. 3 is a longitudinal section through a mass flowmeter in accordance with the present invention.

In accordance with the present invention, a flowmeter having mechanical components very similar to the mechanical components of the known flowmeter described above is modified to eliminate electromagnetic elements, or at least the electromagnetic elements close to the flowmeter. As shown in FIG. 3, the modified flowmeter 20 in accordance with the present invention has a casing 18 identical to the casing of the known flowmeter except as described below. Similarly, the turbine 3, shaft 4, straightener 5, drum 6, impeller 7 and torsion spring 8 are the same as for the known flowmeter, except that the upstream edge portion of the drum wall 13 has been trimmed to expose small optical targets 22 carried by the impeller at the same locations as the magnets of the known construction. Similarly, optical targets 21 are carded by the drum at the same location as the magnets of the previous construction. The casing of the flowmeter has been modified to have through bores or ports extending inward in radial alignment with the rotating optical targets 21 and 22. The ports have inserts 27 and 28, respectively, in which the ends of optical fibers 29 and 30 are fitted. Such inserts also carry lenses 31 and 32 for focusing light projected through the fibers onto the optical targets 21 and 22.

Preferably, the exposed faces of targets 21 and 22 are highly reflective. The peripheries of the drum and impeller aligned with the inserts 27 and 28 are not. For prototype construction, the ends of the impeller and drum magnets were polished to a highly reflective state, although smaller and lighter target 21 and 22 in the form of mirrors would be preferred. The remainder of the drum periphery in the area radially aligned with the drum magnets was blackened. The impeller also was blackened in the area radially aligned with the impeller magnets.

In accordance with the present invention, fibers 29 and 30 convey pulses of light which, by analyzing reflections, can be used to calculate the velocity and deflection angle between the impeller and the drum. Input pulses are conveyed through an optical input cable 40 to a splitter-coupler 41. Such input pulses are split to identical pulses passing to the drum fiber 29, impeller fiber 30 and a third "reference" fiber 42. Reflections of the input pulses are conveyed by fibers 29, 30 and 42 back to the coupler 41 and through it for passage through a single optical output cable 43 to the signal-analyzing equipment which can be located away from the remainder of the flowmeter. As described below, fiber 29 includes a delay coil 44 and fiber 30 includes a delay coil 45 which enable reflections from the different locations to be isolated.

Figure 4:
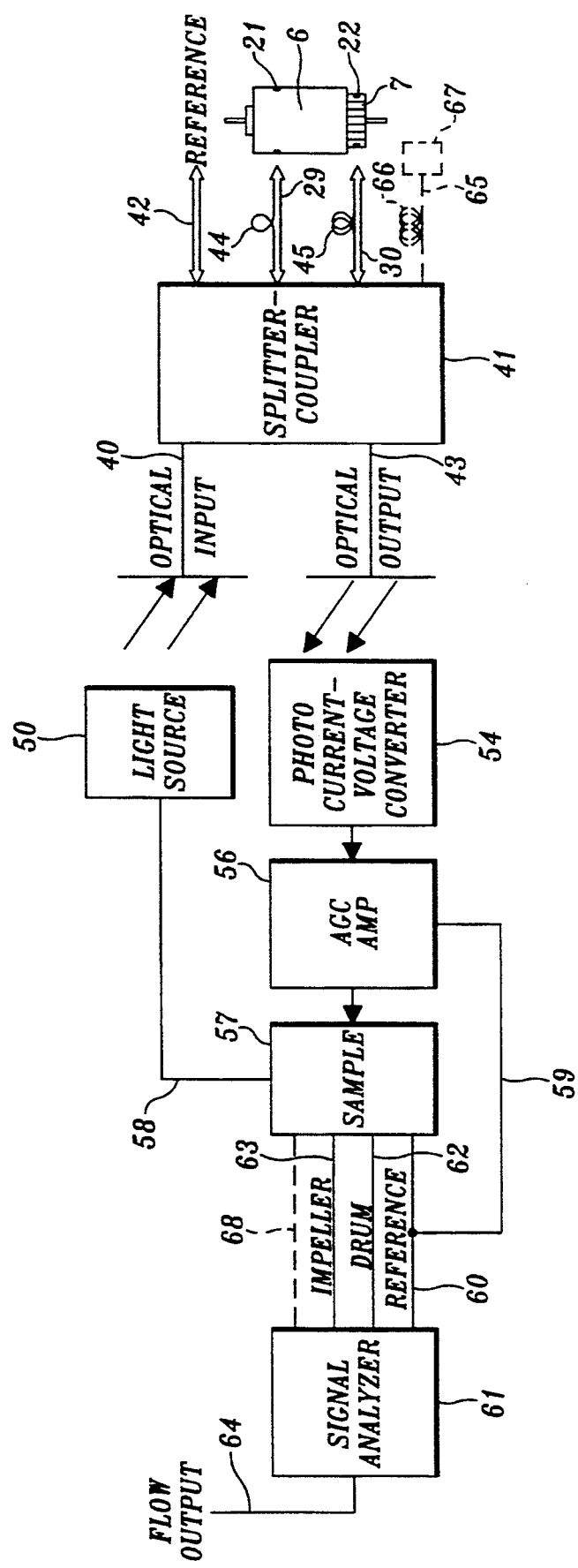
FIG. 4 is a block diagram of the preferred optical and electronic circuit used in the mass flowmeter in accordance with the present invention.
Figure 5:
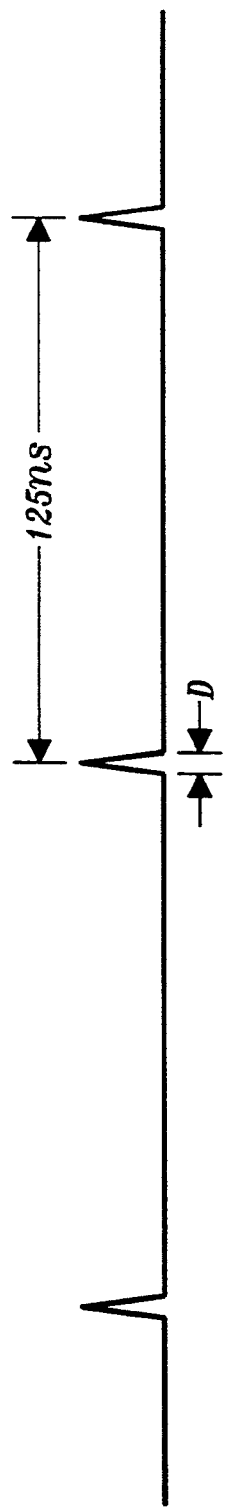
FIG. 5, FIG. 6 and FIG. 7 are corresponding graphs illustrating waveforms of optical output and input pulses generated and analyzed by the system in accordance with the present invention.

The optical signal-analyzing system is diagrammatically illustrated in FIG. 4. A remote light source 50 such as a light-emitting diode is used to provide optical input pulses of very short duration at a rapid frequency. The waveform of the light source output is illustrated in FIG. 5. In a representative embodiment, the duration D of each pulse can be about 5 nanoseconds and the pulse repetition frequency can be 8 megahertz, such that there is a delay of 125 nanoseconds from the beginning of one pulse to the next.

Returning to FIG. 4, the short, widely spaced, but frequent optical input pulses are transmitted by input cable 40 through the splitter-coupler 41 to each of the three fibers 29 (drum), 30 (impeller) and 42 (reference). Fiber 42 ends at a mirror or other highly reflective element which can be achieved by application of a reflective coating to the end of the fiber. Consequently, each output pulse is immediately reflected by the reference fiber for passage back through the coupler 41 to the input end of the optical output cable 43. The waveform of reference reflections through cable 42 is nearly identical to the waveform shown in FIG. 5 except for some decrease in amplitude caused by line attenuation.

Figure 6:
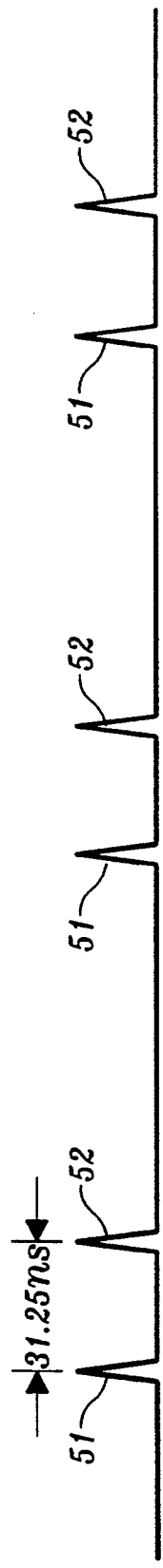

The pulses conveyed by the optical input cable 40 also are applied through the optical fiber 29 leading to the drum. Such fiber includes the delay coil 44. The result is that there is a stagger in the timing of application of the output pulse to the end of the drum fiber 29 as compared to application of the pulse to and through the end of the reference fiber 42. During the period of time that the reflective optical target 21 of the drum is registered with the end of fiber 29, pulses are reflected back through the delay coil 44 to the coupler 41 and through the output cable 43. The waveform is illustrated in FIG. 6 and includes the reflected reference pulse 51 followed by the pulse 52 reflected by the optical target of the drum. The maximum speed of rotation of the drum is small as compared to the high pulse repetition frequency. For example, the drum may rotate at a maximum speed of 100 to 200 revolutions per minute at maximum flow rate. Consequently, each time the optical target of the drum passes the end of fiber 29, a large number of the optical input pulses will be reflected. In a representative embodiment, the delay coil 44 for the drum is constructed to result in a delay of 31.25 nanoseconds, one-quarter of the time between consecutive input pulses.

Figure 7:

The optical input pulses also are applied through the impeller fiber 30 and its delay coil 45. Coil 45 is constructed to result in a longer delay than coil 44 for the drum fiber 29. During the period of time that the optical target 22 of the impeller passes by the free end of fiber 30, the input pulses will be reflected back through coil 45, fiber 30, coupler 41, and the output line 43. The waveform shown in FIG. 7 illustrates the longer delay (62.5 nanoseconds in a representative embodiment) from the time of receipt of a reflected reference pulse 51 to the time of receipt of a pulse 53 reflected by the impeller target.

As illustrated in FIG. 4, the optical signals applied to the input end of the optical output cable 43 are transmitted through the output end of such cable 43 for application at a remote location to a conventional photocurrent to voltage converter. The resulting variable voltage electrical signal is fed to an automatic gain control amplifier 56. The signal from amplifier 56 is applied to a sampling circuit 57. As represented by the line 58 in FIG. 4, operation of the sampling circuit is synchronized with operation of the optical input light source 50.

By sampling the electrical signal corresponding to the optical signal conveyed by cable 43, the circuit in accordance with the present invention can discriminate between the reference reflections, drum reflections and impeller reflections. For example, the sampling period for the reference reflection encompasses the known period of return of the reference pulses, but not the period of return of the delayed drum and impeller pulses. The sampling circuit integrates the returning reference pulses so as to achieve a DC voltage output on line 60. Feedback along a line 59 to the automatic gain control circuit 56 is used to adjust the amplification of the system such that the DC voltage on reference output line 60 is constant.

Sampling circuit 57 also samples the baseline signal which is indicative of optical and electronic noise present in the system, corresponding to the integrated output of the background regardless of whether or not a pulse is returning.

The sampling circuit 57 provides separate integrated outputs for the drum reflections and impeller reflections on lines 62 and 63, respectively, subtracting the integrated baseline signal. The drum sampling period takes into consideration the delay caused by coil 44, and the impeller sampling period takes into consideration the delay caused by the delay coil 45.

The output waveform for the drum signal on line 62 is represented in FIG. 8. When the optical target 21 of the drum is not registered with the free end of the corresponding optical fiber 29, the output will be slightly greater than the baseline because some reflection may occur from the drum periphery. As the drum output signal starts to include pulses reflected from the drum target, the voltage increases to approximately the reference voltage. When a drum optical element has passed the end of fiber 29, the drum output signal decreases to close to the level of the baseline.

The output signal on line 63 for the impeller is represented in FIG. 9 and is of essentially the same shape as the waveform for the drum output signal. The difference is that the impeller signal will be delayed due to deflection of the impeller relative to the drum by fuel passing through the flowmeter. Actually, there is the additional built in delay of 31.25 nanoseconds, but on the scale of FIGS. 8 and 9, that delay would be barely perceptible. In a representative embodiment, minimum detectable impeller delay due to impeller deflection at low flow rates would be on the order of two milliseconds, i.e., many times greater than the additional coil delay. At high flow rates the delay due to impeller deflection could be approximately 150 milliseconds.

To provide an output indicative of impeller deflection and speed, a point midway between the baseline and the integrated reference signal can be set as the trigger for a flip-flop in the signal analyzer 61 resulting in the waveform illustrated in FIG. 10. The output of the flip-flop can be set high during the rise of the drum signal and be set low during the rise of the impeller signal. The signal analyzer 61 provides the flip-flop output signal on an output line 64. Such output signal has a pulse width W equal to the impeller delay, a function of impeller velocity and deflection, to indicate the mass flow rate of fuel passing through the flowmeter.

Since only optical elements are used adjacent to the mechanical components of the flowmeter, the flowmeter is not subject to electromagnetic interference. In addition, it is believed that a more precise measuring of the mass flow rate can be achieved, particularly for very low flow rates. Heavy magnets will not be required, and interaction between the magnets and magnetic-responsive elements is eliminated.

The optical system as described above can be modified to include additional signals to increase the precision of the flowmeter. One cause of error is changing temperature of the fuel which affects operation of the mechanical components. With reference to FIG. 4, a fourth line 65 from splitter-coupler 41 can be provided with a distinct delay characteristic caused by a delay coil 66 to be used in conjunction with an optical temperature-sensing unit 67. Sampling circuit 57 then can provide an additional output signal, such as on a line 68, having a voltage varying as a function of the temperature sensed by unit 67. The temperature information can be used by the signal analyzer to adjust the flow output signal to reflect more accurately the actual flow rate despite a change in fuel temperature.

The system for discriminating between differently delayed signals can be similar to the system described in Lindsay et al., U.S. Pat. No. 4,681,395, issued Jul. 21, 1987, titled "TIME DOMAIN INTENSITY NORMALIZATION FOR FIBER OPTIC SENSING." Such system is described in more detail in the article titled "A standard fiber optic sensor Interfaces for Aerospace applications: Time Domain Intensity Normalization (TDIN)" published in *SPIE*, volume 989 (1988) at pages 57-67. In the TDIN system, a reference signal and a delayed signal are transmitted along common transmission lines so as to be subjected to the same line losses, coupler losses, background noise, etc. Any difference in intensity between the two signals is assumed to be due to the optically varying characteristics of an optically sensitive unit. The TDIN system was designed for detecting differences in the intensity, whereas in the present system similar electronic techniques are used primarily to detect changing timing of pulse signals.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A flowmeter for measuring the rate of flow of a fluid comprising a casing for conveying the fluid therethrough, a first rotatable member disposed in said casing in the path of the fluid, a second rotatable member disposed in said casing in the path of the fluid, means interconnecting said rotatable members such that the flow rate of fluid is a function of the relative rotations of said rotatable members, each of said rotatable members including an optical target moved in a circular path relative to said casing by rotation of its member, two light transmission lines, one for each of said targets, and each having an end mounted stationarily relative to said casing and exposed optically to its target during movement of such target through a segment of the circular path of such target, and means for detecting optical exposure of said targets to said ends of said light transmission lines and for generating a signal indicative of the relative rotations of said members, said detecting means including means for transmitting pulses of light through said transmission lines, means for detecting reflections of the pulses by said targets, means for returning the reflected pulses through said transmission lines, means for delaying pulses reflected by one of said targets to a greater degree than pulses reflected by the other of said targets, and means for sampling the returning pulses so as to isolate pulse reflections of one of said targets from pulse reflections of the other of said targets.

2. The flowmeter defined in claim 1, in which the delaying means includes a delay coil in one of the two light transmission lines.

3. The flowmeter defined in claim 1, including a third transmission line having input and output ends, the detecting means including a coupler for connecting the two light transmission lines to said input end of said third transmission line for transmission of the returning pulses from both of the two light transmission lines therethrough, said output end of said third transmission line being connected to the sampling means.

4. A flowmeter for measuring the rate of flow of a fluid comprising: a casing for conveying the fluid therethrough; a first rotatable member disposed in said casing in the path of the fluid, said first rotatable member including a first optical target moved in a circular path relative to said casing by rotation of said first rotatable member; a second rotatable member disposed in said casing in the path of the fluid, said second rotatable member including a second optical target moved in a circular path relative to said casing by rotation of said second rotatable member; means interconnecting said first and second rotatable members such that the flow rate of fluid is a function of the relative rotations of said rotatable members; a first light transmission line having a first end mounted stationarily relative to said casing and exposed to said first optical target during movement of said first optical target through a segment of the circular path of said first optical target, said first light transmission line having a second end remote from said first end; a second light transmission line having a first end mounted stationarily relative to said casing and exposed optically to said second optical target during movement of said second optical target through a segment of the circular path of said second optical target, said second light transmission line having a second end remote from said first end of said second light transmission line; and means for detecting optical exposure of said first and second optical targets to said first ends of said first and second transmission lines, said detecting means including a light source for generating pulses of light for transmission through said first and second transmission lines to and through their first ends, means for detecting reflections of the pulses by said first and second optical targets, means for delaying pulses reflected by one of said first and second targets to a greater degree than pulses reflected by the other of said first and second targets, and means for sampling the returning pulses so as to isolate pulse reflections of one of said first and second targets from pulse reflections of the other of said first and second targets and for generating a signal indicative of the relative rotations of said first and second rotatable members.

5. The flowmeter defined in claim 4, including a third transmission line having input and output ends, the detecting means including a coupler connecting the second ends of said first and second transmission lines to said input end of said third transmission line for transmission of the returning pulses from both said first and second transmission lines through said third transmission line, said output end of said third transmission line being connected to said sampling means.

6. The flowmeter defined in claim 4, including a reference light transmission line separate from the first and second light transmission lines, the light source including means for transmitting pulses through said reference transmission line, said reference transmission line having an end remote from said light source and means for reflecting pulses at said remote end, the delaying means including means for delaying pulses reflected by said first optical target relative to pulses reflected by the reflecting means of the reference transmission line and means for delaying pulses reflected by said second optical target to a greater degree than pulses reflected by said first optical target, and the sampling means including means for isolating pulse reflections of said reference line, said first transmission line and said third transmission line.

7. The flowmeter defined in claim 4, in which the sampling means includes means for isolating pulses from the first optical target from pulses from the second optical target and means for generating a signal varying as a function of the difference in delay time between pulses returning from the first optical target and pulses returning from the second optical target.

8. The flowmeter defined in claim 4, in which the light source generates pulses at a substantially constant frequency with a pulse width much smaller than the time between consecutive pulses.

9. The flowmeter defined in claim 8, in which the pulse delay time achieved by the delaying means is much shorter than the time between consecutive pulses generated by the light source.

* * * * *